United States Patent
Bieber

(10) Patent No.: US 11,259,057 B2
(45) Date of Patent: Feb. 22, 2022

(54) METHODS, DEVICES AND SYSTEM FOR GENERATING A WATERMARKED STREAM

(71) Applicant: Nagravision S.A., Cheseaux-sur-Lausanne (CH)

(72) Inventor: Yann Bieber, Lausanne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 492 days.

(21) Appl. No.: 16/309,158

(22) PCT Filed: Jun. 13, 2017

(86) PCT No.: PCT/EP2017/064330
§ 371 (c)(1),
(2) Date: Dec. 12, 2018

(87) PCT Pub. No.: WO2017/216125
PCT Pub. Date: Dec. 21, 2017

(65) Prior Publication Data
US 2019/0335213 A1    Oct. 31, 2019

(30) Foreign Application Priority Data
Jun. 15, 2016 (EP) .................................... 16174576

(51) Int. Cl.
*H04N 21/2389* (2011.01)
*H04N 21/236* (2011.01)
(Continued)

(52) U.S. Cl.
CPC . *H04N 21/23892* (2013.01); *H04N 21/23614* (2013.01); *H04N 21/23897* (2013.01);
(Continued)

(58) Field of Classification Search
None
See application file for complete search history.

(56) References Cited

U.S. PATENT DOCUMENTS

2003/0009669 A1* 1/2003 White .................. H04N 7/1675
713/176
2006/0005029 A1 1/2006 Petrovic et al.
(Continued)

FOREIGN PATENT DOCUMENTS

WO       WO 01 67667 A1     9/2001
WO       WO 2015 063537 A1  5/2015

OTHER PUBLICATIONS

Jarnikov et al, "Server-guided Watermarking for Resource-constrained Devices", 13th IEEE Int. Symp. on Cons. Elec., ISCE2009, USA, May 25, 2009, p. 76-80, ISBN: 978-1-4244-2975-2.

*Primary Examiner* — William J Kim
(74) *Attorney, Agent, or Firm* — David P. Owen; Hoyng Rokh Monegier

(57) ABSTRACT

A device (40) for generating a watermarked stream (39), comprising: at least one input interface (41) configured to receive encrypted control messages (20) and conditional access streams (30) including a main stream (33) and protected watermarking data streams (35) from which a watermarking information (38) can be embedded in said watermarked stream (39); a security module (43) configured to process said control messages (20) and to control access to said conditional access streams (30); a descrambler (45) configured to remove protection applied on at least some of said conditional access streams (30); a watermarking unit (47) configured to generate the watermarked stream (39) from said conditional access streams (30) by selectively processing said watermarking data streams (35) depending on access data (AC, AR) included in some of said control messages (20).

10 Claims, 7 Drawing Sheets

(51) Int. Cl.
*H04N 21/44* (2011.01)
*H04N 21/4623* (2011.01)
*H04N 21/266* (2011.01)
*H04N 21/8358* (2011.01)
*H04N 21/845* (2011.01)

(52) U.S. Cl.
CPC ....... *H04N 21/26606* (2013.01); *H04N 21/44* (2013.01); *H04N 21/4623* (2013.01); *H04N 21/8358* (2013.01); *H04N 21/8456* (2013.01)

(56) References Cited

U.S. PATENT DOCUMENTS

| | | | |
|---|---|---|---|
| 2007/0110237 | A1 | 5/2007 | Tehranchi et al. |
| 2007/0258583 | A1* | 11/2007 | Wajs ................ H04N 21/26606 380/42 |
| 2009/0049302 | A1* | 2/2009 | Zhao .................... H04N 21/235 713/176 |
| 2011/0293092 | A1* | 12/2011 | Tran ................. H04N 21/44236 380/210 |
| 2011/0314511 | A1 | 12/2011 | Hartung et al. |
| 2014/0259086 | A1* | 9/2014 | Wajs ................. H04N 21/23605 725/116 |
| 2014/0344850 | A1* | 11/2014 | Wajs ................. H04N 21/4405 725/31 |
| 2015/0043577 | A1* | 2/2015 | Doumen ............. H04L 12/1886 370/390 |
| 2016/0261928 | A1* | 9/2016 | Sarda ................. H04N 21/4343 |

* cited by examiner

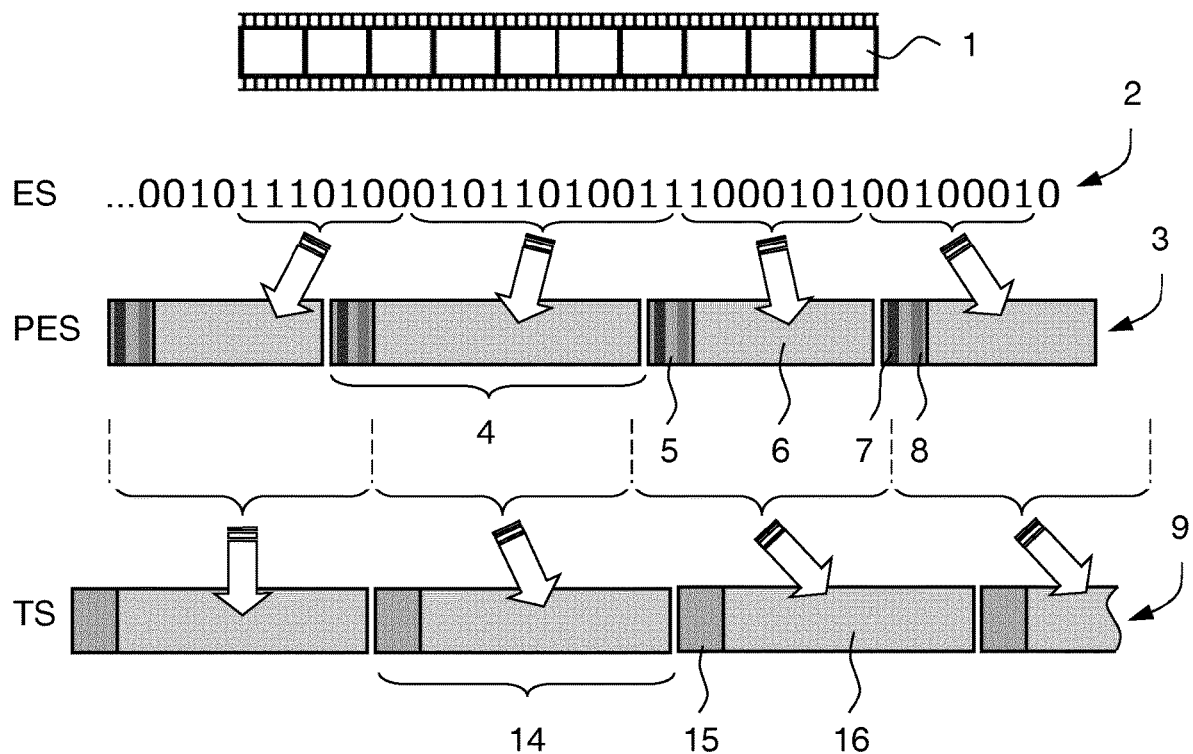
Fig. 1
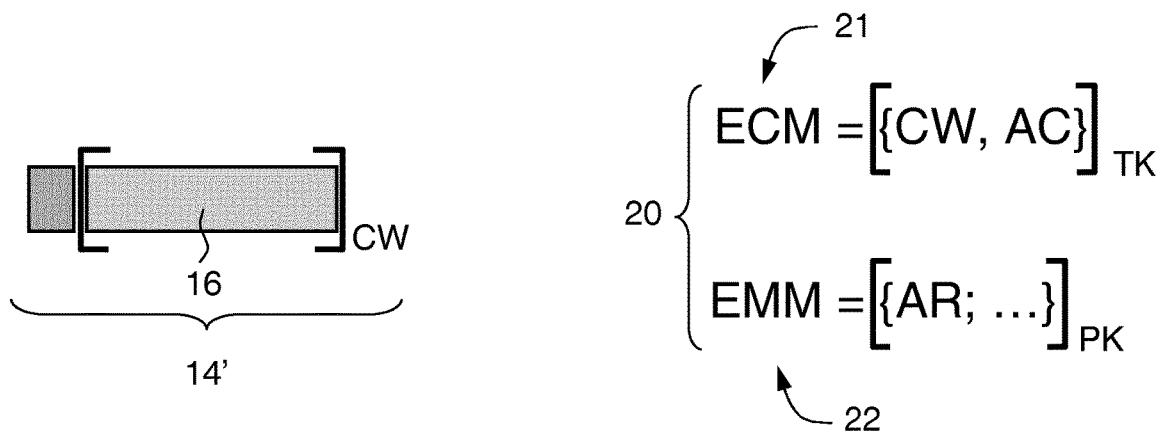
Fig. 2
Fig. 3

METHODS, DEVICES AND SYSTEM FOR GENERATING A WATERMARKED STREAM

BACKGROUND

The present description relates to watermarking of multimedia content provided by a server to a client device. Watermarking techniques aim to embed specific information within the multimedia content. This information usually aims to identify the owner of the content and/or to identify the client device onto which the multimedia content has been processed. This information can be perceptible or imperceptible to humans.

Most solutions rely only on the client device to watermark an identifier in the multimedia content. In this way, the content is altered on the client device before being displayed. This alteration is controlled by the client device. However, such a control remains unreliable because there is no certainty that the client device has not been tampered.

Other solutions rely on the server for watermarking the multimedia content by embedding the registered identifier of the client device before sending the content to the end user. However, since the content is watermarked using the identifier of the client device, such a solution is not convenient for broadcasting multimedia content, namely for transmitting the same content to a plurality of client devices.

Therefore, there is a need to suggest a solution for watermarking content provided to a plurality of client devices, while overcoming, at least in part, the aforementioned concerns.

BRIEF DESCRIPTION OF THE DRAWINGS

To address these concerns, the present description suggests a solution which will be better understood with reference to the attached figures in which:

FIG. 1 schematically depicts an example of a stream architecture that may be compliant with the solution suggested in the present description.

FIG. 2 schematically depicts a cryptographic protection of a data packet that may be contained in a stream.

FIG. 3 is a schematic representation of two types of encrypted control messages compliant with the present solution.

DETAILED DESCRIPTION

Figure 4:
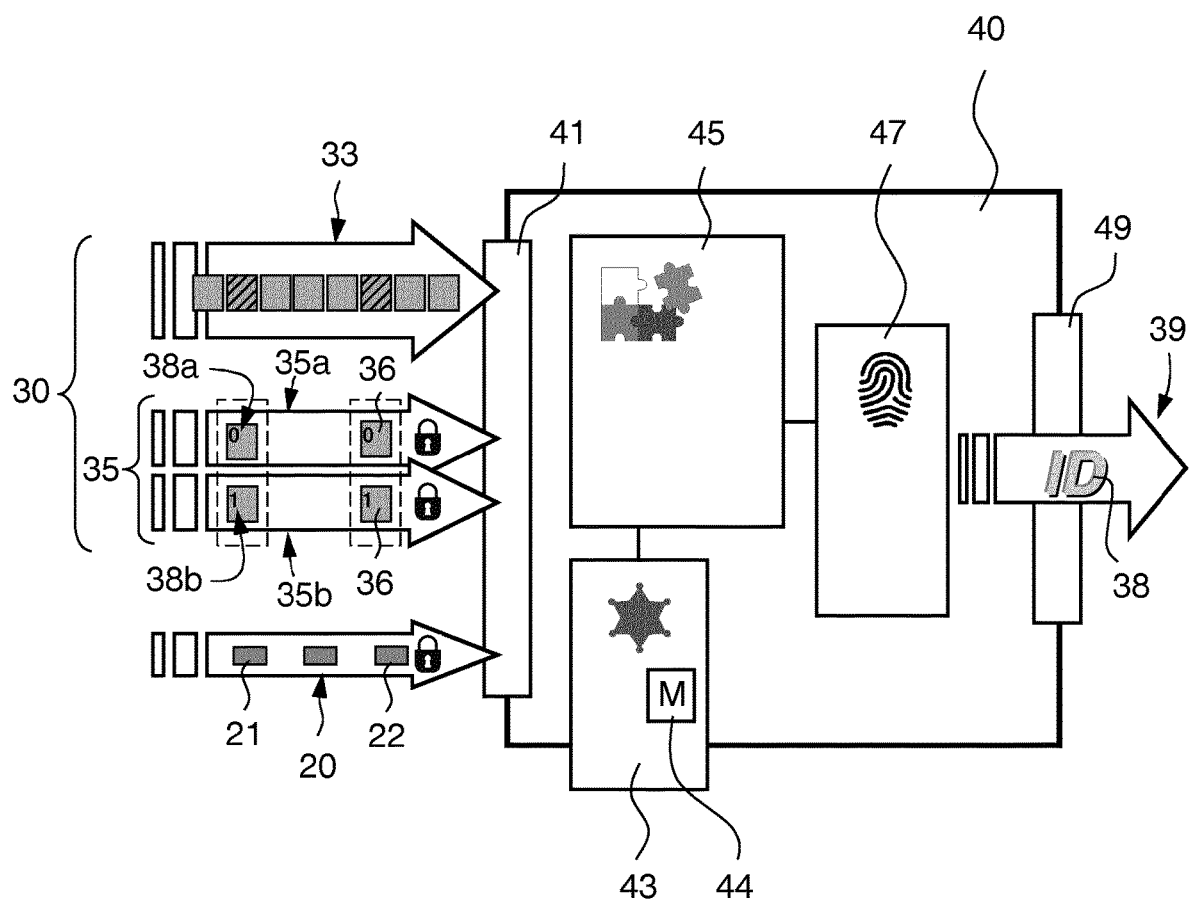
FIG. 4 is a schematic representation of a device of the present solution together with several streams.

In the following detailed description, the present solution is disclosed through several subject-matters and embodiments which should be taken as non-limitative examples.

Stream Architecture

Any digital content is substantially processed in a sequential manner, whatever the way through which this content is provided to the device which has to process this content. Thus, the content appears as a data stream for the device. Since the stream may include a large amount of data, this stream cannot be provided to the device in a single element. Therefore, the stream is cut into chunks so as to form data packets.

The architecture of MPEG streams is briefly reviewed in the following lines as an example of packetized streams. It should be understood that the solution suggested in the present description is not limited to MPEG streams, but is applicable to any kind of digital data stream. The present description is preferably directed to multimedia content such as audio or video content streams. Although over-the-top streams are composed of several video streams of different bitrates, it should be noted that audio/video streams are usually made of one video stream, at least one audio stream—depending on available languages associated to the video stream, and data streams which may include textual data, metadata (e.g. Program Specific Information) or control messages used, for example, in the Pay-TV field for conditional access purposes. Although the present description preferably refers to video stream as being the main content stream that has to be watermarked, it should be understood that such a video stream is taken as a non-limitative example.

The video stream provided by a digital camera is typically delivered in a form of a digital stream. This digital stream may be an uncompressed stream or it may be already provided in a compressed form, for example encoded according to a common standard (e.g. MPEG, MPEG-2, MPEG-4 AVC). More specifically, the digital stream may be provided in packetized form. To better understand the architecture of these streams, FIG. 1 shows several kinds of streams through various converting steps, starting from an analog video stream, for the sake of completeness.

Referring to FIG. 1, an original analog video stream 1 is digitalized using an encoder, so as to convert the analog video stream 1 into a digital stream which is encoded according to a standard (e.g. MPEG) to compress data for saving bandwidth. At its output, the encoder provides an elementary stream 2 which can be regarded as a continuous bit stream of a compressed signal having a syntax defined by the applied standard (e.g. MPEG). Such syntax ensures that any decoder may further interpret the elementary stream.

For convenient purposes, the elementary stream 2 is cut into packets during a segmentation and packetization step for converting the continuous elementary bit stream 2 into a packetized elementary stream 3. This elementary stream 3 comprises a plurality of data packets known as Packetized Elementary Stream PES packets 4. For example, these PES packets may correspond to an image and can have different length, for example depending on the amount of data comprised in this image. Such an amount of data may vary for example due to the nature of the image, e.g. I-frame, P-frame, B-frame, the size of the image, its resolution or due to any other reason. Each PES packet 4 is made of a header 5 and a payload 6. The header 5 comprises several data including identification data 7 (StreamID) and synchronization information 8. Synchronization information may refer to clock reference data and/or to time stamps Decode Time Stamp/Presentation Time Stamp DTS/PTS. For example, a Decode Time Stamp DTS indicates when the image is to be decoded, whereas a Presentation Time Stamp PTS indicates when the image is to be presented to the output of the decoder. These time stamps may differ depending on the nature of the image.

From the PES packets 4, a transport streamTS 9 is made by further segmenting the packetized elementary stream 3 into so-called TS packets 14. TS packets have all the same length, typically 188 bytes length and are also made of a header 15 and a payload part 16. The header 15 further comprises transport and multiplexing information including Packed Identifier PID, since the transport stream 9 is outputted by a multiplexer and sent in a multiplexed form to the client devices.

Conditional Access Data Architecture

In a digital pay television system, the multimedia content such as cinematographic events, sports events, entertainment, information, debates, etc., included in the payload part 16 of the TS packets 14 can be protected in order to control the access to the multimedia content.

As shown in FIG. 2, the protection is typically a cryptographic protection obtained by encrypting the payload part 16 of the TS packets 14 using a cryptographic key, for example a cryptographic key compliant with a symmetrical encryption scheme. This cryptographic key may be valid for one packet or for more than one packet, e.g. for a plurality of packets or even for all the packets of the multimedia content. In one embodiment, validity duration may be assigned or associated to this cryptographic key. For example, such duration may be infinite, so that this cryptographic may be valid at any time. Preferably, this cryptographic key is a control word CW. Still preferably, this control word is valid for a predefined duration, as explained hereafter.

In FIG. 2, the encryption is schematically represented by brackets around the payload part 16. The control word CW can be regarded as a cryptographic key required for decrypting the encrypted TS packet 14'. More specifically, the control word may be required for decrypting the payload part 16 of the packet, since the header 15 remains in a clear form for identification and routing purposes. Such an encryption is achieved by a scrambler located on the server side e.g. broadcaster or content provider, before multiplexing the TS packets. The control words are changed at regular intervals, typically from 1 to 30 seconds, in order to deter any hacker from trying and finding such a control word to decrypt the TS stream 9. This means that the TS packets 14 of a stream portion up to 30 seconds of the TS stream 9 are encrypted using one control word, and the next 30 seconds of the TS stream are encrypted using another control word, and so on. Each encrypted portion of the TS stream corresponds to a so-called crypto-period, since a crypto-period represents the time interval during which the content, i.e. the TS stream can be decrypted using the same control word.

On the client side, the client devices receiving the TS stream may refer to decoders (Set-Top-Box), computers, tablets, smartphones, etc. If the TS packets containing audio or video content are protected, as explained above, the client devices must receive, in due time, the required control words to be able to decrypt the stream. To this end, these control words are sent in addition to the audio/video content packets 14, for example within the multiplexed TS stream. Alternatively, the control words may be sent separately from the audio/video content packets, for example within an autonomous data stream, so that the control words are not necessarily multiplexed within the TS stream.

As shown in FIG. 3, the control words CW are sent in control messages 20, typically in entitlement control messages ECM 21, which are themselves encrypted by a so-called transmission key TK. The latter is specific to the transmission system established between the server and the client devices assigned to the server. More specifically, the transmission key TK is known both by the server and the security module of each of these client devices. Indeed, on the client side, the security operations which involve the handling of control messages 20 are generally carried out in a security module associated to the client device.

The security module can be realized in particular according to four different embodiments. One of them is a microprocessor card, a smart card, or more generally an electronic module which may have different form factors, having the form of a key, a badge . . . . Such a module is generally removable, connectable to the receiver and considered tamper-proof. The form with electric contacts is used the most, but does not exclude a contactless link, for example of the ISO 15443 type.

A second known embodiment is that of an integrated circuit housing, generally placed in a definitive and non removable way in the housing of the receiver. A variant consists of a circuit mounted on a base or connector such as a SIM module connector.

In a third embodiment, the security module is integrated into an integrated circuit housing also having another function, for instance in a descrambling module of the decoder or the microprocessor of the decoder.

In a fourth embodiment, the security module is not realized as hardware, but its function is implemented in the form of software only.

Although the security level differs among these cases, the function is identical in itself so that we may talk of security module irrespectively of the embodiment of this module. In the four embodiments described above, the security module has means to execute a program such as a control processing unit CPU, stored in its memory. This program allows carrying out security operations, verifying the rights, carrying out decryptions, activating a module to carry out cryptographic operations, etc.

As shown in FIG. 3, the ECM 21 does not only contain the control word, but also contains conditions that have to be met for transmitting this control word from the security module to the client device. These conditions are known as access conditions AC, since they define the required entitlement to get access to the control word which is also conveyed by the ECM 21 with the access conditions AC. After having decrypted the ECM using the transmission key TK, the security module firstly verifies whether access rights AR are present in the security module. The access rights AR are assigned to the client device and may be received by the latter through dedicated control messages. This operation aims to check whether the access right AR, required to decrypt the TS stream, is present in the security module associated to the client device, e.g. to its security module. The control word CW is sent to the client device, for example to the descrambler of the client device, only if such verification provides a positive response.

The access right AR typically depends on the subscription of the end user to certain channels, e.g. TV channels, suggested by the broadcaster. These channels are usually grouped into a set of channels, called bouquet, and the access to each bouquet may be controlled by means of a dedicated access right AR. Therefore, the end user can have one or several access rights depending on his subscription with the content provider.

In order to provide the security module with the access right AR, the latter has to be loaded from a specific control message transmitted by the server to the client device. More specifically and as shown in FIG. 3, the access right AR is sent through an entitlement management message EMM 22 which, for security reasons, is usually encrypted by a personal key PK that is specific to the security module. Although a single access right AR has been shown within the EMM 22 of FIG. 3, an EMM may contain more than one access right AR. In addition, since the access right usually depends on the subscription of the end user, there is no need to frequently transmit the access right through EMMs. For this reason, the EMMs are generally transmitted by the server to the client device e.g. on a monthly basis, namely at time intervals which are much longer than those for providing the control words through the ECMs.

Although only one control word is active for a given time, e.g. a crypto-period, the descrambler of the client device usually requires two control words, namely the current CW and the next CW which will be used during the next crypto-period. Providing the descrambler with the next control word allows reducing any break down during the descrambling process, i.e. the decryption of the encrypted TS packets 14'. As schematically shown in FIG. 3, a single control word has been illustrated in the ECM 21 for the sake of simplification. It should also be noted that the client device may store a large number of control words, either for a simultaneous use, or for being ready in case of change of channels, or even for a combination of these two modes.

From the above described conditional data architecture, one can note that the encrypted TS packets 14' comprising audio or video content and the entitlement control messages ECMs can be sent through the multiplexed TS stream to a plurality of client devices because the same ECMs can be used by a plurality of client devices to decrypt the encrypted TS packets 14'. A client device that is not entitled to decrypt the encrypted TS packets 14' will simply ignore the packets that cannot be decrypted. Accordingly, such architecture is well suited for transmitting multimedia content to numerous client devices, irrespectively of the access rights assigned to each of these client devices. The broadcasting transmission is taken here in its broadest meaning and may include other routing schemes such as multicast, anycast or geocast schemes for example.

Subject-Matters of the Present Solution

The watermarking solution suggested in the present description relates to more than one subject-matter since it may imply a client device, a server, a system comprising the client device and the server, and a first method that can be implemented in this server as well as a second method that can be implemented to the client device. Each of these subject-matters will be successively described in the present description.

Client Device

The client device relates to any device suitable to generate a watermarked stream. For example, this device can be a set-top-box STB, sometimes called decoder, or any similar multimedia device. It could be part of a television screen or a module plugged into one interface of the television screen.

FIG. 4 schematically shows an overview of such a device 40 configured to generate a watermarked stream 39. To this end, the device 40 comprises at least one input interface 41 configured to receive protected control messages 20.

The input interface 41 is also configured to receive other data or streams and in particular conditional access streams 30. These conditional access streams 30 include at least a main stream 33 and protected watermarking data streams 35. The protected watermarking data streams 35 are used as data sources for generating a watermarking information 38 that can be embedded in the watermarked stream 39.

The device 40 further comprises a security module 43. The security module 43 is configured to process the control messages 20 and to control the access to the conditional access streams 30.

The device 40 also comprises a descrambler 45 configured to remove protection applied on at least some of the conditional access streams 30.

Finally, the device 40 comprises a watermarking unit 47 configured to generate the watermarked stream 39 from the conditional access streams 30 by selectively processing the watermarking data streams 35 depending on access data included in some of the control messages 20.

The control messages 20 can be protected by any suitable means, for example a password, a cryptographic key compliant with any encryption scheme, for example a symmetric key. The protected control messages 20 are preferably received through a single data stream and are still preferably of the same kind as those shown in FIG. 3. Thus, they may include entitlement control messages ECM 21 and entitlement management messages EMM 22 which are respectively protected using a transmission key TK and a personal key PK. The transmission key TK is generally known by a plurality of client devices 40 having a same subscription to the same content provider or server, from which the control messages are received. On the other hand, the personal key PK is generally known by a single device 40, because this key PK is used to protect EMMs 22 which are rather personal messages send by the server to a single device 40. For this reason, the personal key PK may be regarded as being a unique key assigned to a single device 40.

Preferably, the main stream 33 is similar to the TS stream 9. Accordingly, the main stream 33 may comprise packets, preferably TS packets 14, 14' as illustrated in FIG. 1 or FIG. 2.

As schematically shown in FIG. 3, the watermarking information 38 is illustrated through the embossed imprint "ID" applied on the arrow 39 which represents the watermarked stream output from the device 40. The watermarking information 38 is a digital information and may relate to any information. Preferably, the watermarking information refers to an identifier ID, for example the identifier of the client device, that of the security module of the client device, the identifier of the session during which a multimedia content is received from the server, or any combination of identifiers including for instance the identifier of the server, the content provider or the content owner.

The security module 43 may be realized according to various embodiments, as already disclosed above.

The access data included in some of the control messages 20 may refer to access condition(s) AC and/or access right(s) AR. Preferably, these access condition(s) AC and access right(s) AR are respectively included in ECM and EMM messages, as shown in FIG. 3.

Returning to the security module 43, the latter is more specifically configured to decrypt the protected control messages 20 (ECMs 21, EMMs 22) using the appropriate key TK, PK which are preferably stored within the security module. The cryptographic keys and algorithms are preferably kept within the security module, for example on a support 44 such as an authentication device, monolithic chipset, secure memory, etc., reputed as being inviolable. Generally speaking, the security module 43 may be further configured to store access rights AR assigned to the device 40 and cryptographic keys e.g. TK, RK, and still preferably it may be configured to further store the required algorithm(s). Alternatively, at least some of these sensitive data may be stored in a secure database or in a database, access to which is secure and/or restricted to the security module for example.

After having decrypted the ECM and EMM messages, the security module can have access to data contained in these control messages and can check, for example, whether the access conditions AC included in the ECMs 21 meet the access rights AR assigned to the device 40. As the access rights AR may be transmitted via EMMs 22, the security module is also in charge of updating the access rights assigned to the device 40. Depending on the result of such a checking operation, the security module can transmit, to the descrambler 45, the control words included in the ECMs 21 and required to remove the protection applied on at least some of the conditional access streams 30. If the descrambler 45 does not receive the required means to remove such a protection, it will have no alternative but to ignore the step aiming to remove the protection of some of these streams 30. It should be kept in mind that the present description will preferably refers to control words as decryption keys included in the control messages such as the ECM messages. However, other types of key may be used as decryption key instead of these control words.

The conditional access stream 30 can be protected using different manners in order to control the access to these streams 30.

According to a first way, the protection may be a cryptographic protection applied to the stream, in particular to the payload data of the packets contained in this stream as shown in see FIG. 2, using a cryptographic key. This key is input as a cryptographic parameter into a cipher algorithm together with the content to encrypt. This algorithm outputs a scrambled content which is an encrypted content. This process is reversible, so that a clear content can be retrieve from the scrambled content, using the same key, for example a symmetric key, and the same cipher algorithm. Therefore, the key and the cipher algorithm have to be known both by the sender, i.e. server and the receiver, i.e. the security module.

According to a second way, the protection may be carried out by keeping some original data extracted from a stream and, for example, by replacing original data by dummy data in the stream. Preferably, the format of the protected stream is the same as that of the original stream. Therefore, the dummy data may produce impairments, e.g. artifacts, which can be more or less important according to different degradation levels. On the other hand, if the format of the stream is not kept, the protected stream may completely break the decoding of the stream by the client device. Such a protection can be removed by providing the original data in addition to the protected stream so that the descrambler may undertake the reconstruction of the stream by putting back the original data instead of the dummy data. It should be noted that such a reconstruction may be a full or a partial reconstruction, depending on whether all or a part of the original data are transmitted to the client device.

Whatever the first or the second way applied to protect the streams, the latter can be regarded as condition access streams because the access to their clear form or original form, depends on the means, i.e. key, original data, required to unprotect them. The first way and the second way may be used separately to protect the streams. Alternatively, they may be used together to provide different protection levels applied to a single stream. Accordingly, the descrambler 45 should be regarded as being configured to descramble at least some of said conditional access streams 30 or to remove or release protection applied on at least some of these conditional access streams.

According to the present solution, the number of watermarking data streams 35 suitable to be processed by the device 40 is at least equal to a radix, i.e. the base, of a numeral system in which the watermarking information 38 is coded. For example, in the illustration provided in FIG. 4, the number of watermarking data stream 35 is two—see the watermarking data streams 35a and 35b, because the numeral system in which the watermarking information 38 is coded is a binary system. Since the radix, namely the base, of the binary system is 2, therefore only two watermarking data streams 35a, 35b are required to code the watermarking information 38. In other words, the watermarking information 38 is represented via a binary number, and this binary number is built from the watermarking data streams 35a, 35b. These streams 35 are therefore used as binary data sources to embed the watermarking information 38 into the main stream 33 so as to generate the watermarked stream 39.

Although FIG. 4 and the present description are mainly based on two watermarking data streams 35, it should be understood that this is not a requirement, since the numeral system in which the watermarking information 38 is coded may be different from a binary system. Indeed, the radix may be equal to 3, if the numeral system is a ternary numeral system, i.e. base 3. In this case, the number of watermarking data streams 35 would be equal to 3. Advantageously, the device 40 of the present solution is configured so as any other numeral system may be applied.

As mentioned above, the watermarking unit 47 is configured to generate the watermarked stream 39 from the main stream 33 and the watermarking data streams 35. More specifically, the watermarking unit 47 may be configured to process the watermarking data streams 35 according to a selective manner. This means that, among the available watermarking data streams 35, the watermarking unit 47 makes a selection in order to use only some of these watermarking data streams 35. Preferably, the watermarking unit 47 selects one of the watermarking data streams 35. However, this does not mean that the other watermarking data stream(s), which is (are) not selected, is (are) not used. It should be understood that the watermarking unit 47 is configured to generate the watermarked data stream 39 from the conditional access data streams 30, while using the main stream 33 and, sometimes one of the watermarking data streams, sometimes another watermarking data stream, depending on access data, e.g. access conditions AC, included in some of the control messages 20.

From the foregoing, it should be understood that the selection is controlled by the control messages, for example by the access data included in these control messages. Preferably, the selection is controlled by the access conditions AC and/or the access right AR assigned to the client device. Indeed and as already explained above, e.g. regarding FIG. 3, the control word CW required to decrypt one of the watermarking data stream 35, is transmitted to the descrambler 45 by the security module 43 only if the access rights AR, assigned to the device 40, meet the access conditions AC included in the ECMs used to convey this control word. Therefore, one can consider that the selection depends on the access conditions AC included in the ECM messages and/or the access rights AR included in the EMM messages in view to be assigned to the device 40 or to the security module 43.

As suggested above and shown in FIG. 4, the watermarking data streams 35 may comprise payload portions of an original stream. Consequently, each watermarking data stream 35a, 35b requires a bandwidth which is significantly less broad than that required for conveying the main stream 33. Preferably, these payload portions are referred to watermarked payload portions because they include watermarks 38a, 38b which are specific to each watermarking data stream 35a, 35b. In FIG. 4, the watermark 38a of the first watermarking data stream 35a is illustrated by a bit "0" within each watermarked payload portions, whereas the watermark 38b of the second watermarking data stream 35b is illustrated by a bit "1".

As also shown in FIG. 4, the watermarked payload portions 36 form pairs which are each illustrated by a rectangular dashed line. If the number of watermarking data stream 35 is equal to three, the rectangular dashed line would represent a triplet. Generally speaking, the watermarked payload portions 36 form n-tuple within the rectangular dashed line. Preferably, the watermarks 38a, 38b of the watermarked payload portions 36 are different i.e. distinct, within a same n-tuple. Preferably, the watermarked payload portions 36 of a same n-tuple differ from each other only by their own watermark 38a, 38b. If one considers, for example, that each watermarked payload portions 36 of the same n-tuple corresponds to an image, e.g. a B-frame, of an original video stream that has to be watermarked, each of these watermarked payload portions 36 may be identical except their watermark 38a, 38b. Although, the watermarks 38a, 38b have been illustrated in these examples by a single bit "0" or "1", it should be clear that these watermarks are not limited to one bit, but are preferably made of a specific set of bits or other numeral data depending on the numeral system used to code the watermarking information 38.

As also shown in FIG. 4, the main stream 33 comprises payload portions, e.g. payload parts 16 of TS packets 14, 14', some of which are hatched. These hatched portions may be regarded as dummy portions that have to be replaced using one of the corresponding watermarked payload portions 36 of the n-tuple facing to each dummy portion. To facilitate this mapping, the watermarking data streams 35 may further comprise location data assigned to the watermarked payload portions 36. Such location data may be advantageously used by the watermarking unit 47 to put the watermarked payload portions 36 in predetermined locations within the main stream 33 for generating the watermarked stream 39. Location data can refer to a time basis, e.g. a counter or timestamps, or to any other reference system, e.g. using markers or counting data.

According to the present solution, the watermarking information 38 is progressively embedded in the watermarked stream 39 when generating this watermarked stream 39. This means that the watermarking information 38 is preferably not comprised in full within a single watermarked payload portion 36 of one of the watermarking data stream 35, but that several watermarked payload portions 36 have to be embedded in the watermarked stream 39 when this stream 39 is generated, for embedding the watermarking information 38 therein. More specifically, the watermarking information 38 may be progressively embedded in the watermarked stream 39 by successively processing the watermarked payload portions 36 of the watermarking data streams 35 when generating the watermarked stream 39.

For example, if the watermarking information 38 is a four bit binary number, such as "1001", each of these four bits would correspond to a watermark 38a, 38b embedded in one of the watermarked payload portions 36 of the two watermarking data streams 35a, 35b. As shown in FIG. 4, the watermarks 38a corresponding to a bit "0" may be part of the first watermarking data stream 35a and the watermarks 38b corresponding to a bit "1" may be included in the second watermarking data stream 35b. In this case, the first dummy portion, i.e. hatched portion, of the main stream 33 will be replaced by the corresponding watermarked payload portion 36 of the second watermarking data stream 35b bit "1", then the second dummy portion will of the main stream 33 will be replaced by the corresponding watermarked payload portion 36 of the first watermarking data stream 35a bit "0", then the third dummy portion will be replaced by the corresponding watermarked payload portion 36 of the first watermarking data stream 35a bit "0" and the fourth dummy portion of the main stream 33 will be finally replaced by the corresponding watermarked payload portion 36 of the second watermarking data stream 35b bit "1". Accordingly, the bits "1", "0", "0" and "1" of the watermarking information 38 "1001" will be progressively embedded in the watermarked stream 39 by selectively processing the watermarking data streams 35 when generating the watermarked stream 39.

Such selective processing usually implies to switch among the watermarking data streams 35 from one watermarking data stream to another depending on the current bit "0" or "1" that has to be watermarked. According to the present solution, such switching is not initiated by the device 40, but is controlled by the access data e.g. access conditions AC and/or access rights AR included in some of the control messages and sent by the server.

According to a preferred embodiment, access data may include access conditions AC and/or access rights AR. Moreover, the security module 43 is configured to control the access to the conditional access streams 30 by checking if access rights AR, assigned to the device 40 e.g. to the security module 43 of the device 40, meet access conditions AC obtained by way of some control messages 20. In other words, the security module 43 may check if there is a match between these access rights and access conditions obtained by some of the control messages received by the device. The access rights AR may be stored in the support 44 e.g. memory of the security module 43. The access rights AR are designed to be updated at any time through control messages, for example through entitlement management messages EMMs 22. As the control messages are sent by the server, the latter is able to control access rights AR which have to be assigned to a particular device 40. Once an ECM is received by the device 40, it is transmitted to the security module 43 for its processing. The security module is configured to check if the access rights AR, e.g. stored in the support 44, meet access conditions AC obtained through the received ECM. In case of positive outcome, the security module grants the access to the conditional access stream 30 to which this ECM refers. This can be achieved for example by transmitting the control word conveyed by this ECM to the descrambler 45 so that the descrambler has the required means for decrypting the relevant conditional access stream 30.

In order to ensure that the security module keeps control on the sensitive data, the access to the content of control messages 20 is preferably restricted to the security module, on the client side. In addition and as better shown in FIG. 5, the watermarking data streams 35 are preferably protected by a first protection, e.g. a first cryptographic protection 37'a, 37'b using a specific stream key CWa, CWb. Preferably and as shown in this FIG. 5, the watermarked payload portions 36 of the first watermarking data stream 35a are protected using a first cryptographic protection 37'a which may be a control word CWa specifically dedicated to this first watermarking data stream 35a. Similarly, the watermarked payload portions 36 of the second watermarking data stream 35b may be protected using another cryptographic protection 37'b, which is preferably a control word CWb specifically dedicated to this second watermarking data stream 35b. Accordingly, the control words CWa and CWb are different so that only the control word CWa can decrypt the watermarked payload portions 36 of the first watermarking data stream 35a and only the control word CWb can decrypt the watermarked payload portions 36 of the second watermarking data stream 35b. In other words, the specific stream key CWa, CWb may be regarded as being dedicated or unique to each watermarking data stream 35a, 35b. These specific stream keys CWa, CWb are available to the security module, in particular after that the security module has removed the first protection limiting access to the ECM messages where those specific stream keys were located.

The specific stream keys CWa, CWb are included in some control messages, such as in ECM messages 21. Each of these ECMs is encrypted using a transmission key TK, as already shown and discussed in connection with FIG. 3. Preferably, the ECMs dedicated to convey the stream keys CWa comprise access conditions ACa which are different from the access conditions ACb comprised in the ECMs dedicated to convey the stream keys CWb and used to decrypt another watermarking data stream. Even if ECM messages 21 may appear all similar for the security module 43, they mainly differ from each others thanks to the access conditions AC they contain.

The security module 43 is configured to decrypt the control messages ECMs 21 and to transmit the specific stream key CWa, CWb to the descrambler 45 if the access rights AR, assigned to the device 40, meet the access condition ACa, ACb included in the control message ECM 21 which comprises this specific stream key CWa, CWb. The access to these access rights AR is restricted to the security module 43.

Figure 6:
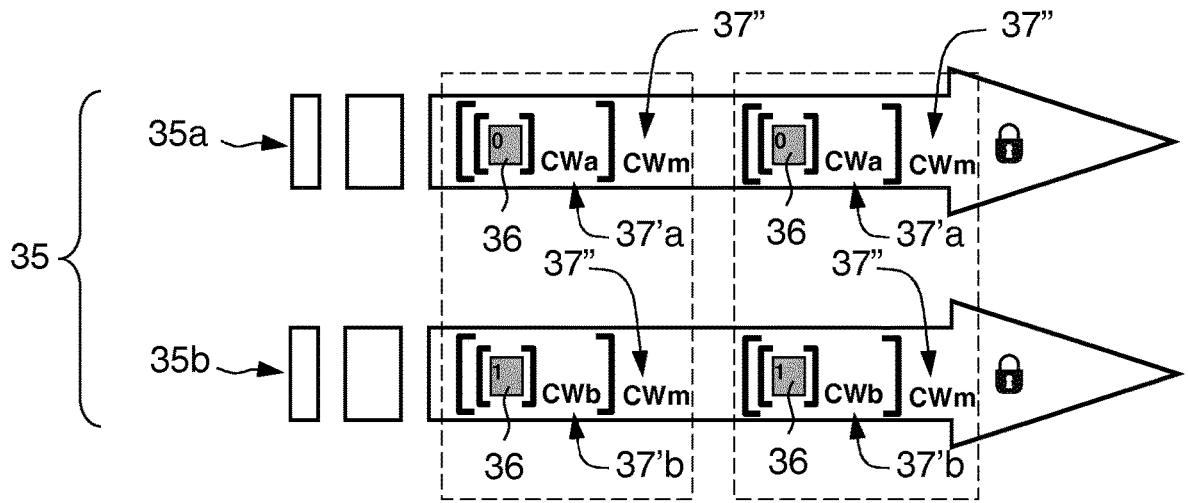

According to another embodiment shown in FIG. 6, the watermarking data streams 35 are further protected by a second cryptographic protection 37" using a common stream key CWm included in some of the control messages 20, such as in ECM messages 21. These ECM messages 21 are preferably dedicated for conveying the common stream key CWm, so that the access condition ACm included in these ECM messages is different from the other access conditions ACa, ACb. In this case, the security module 43 is configured to transmit the common stream key CWm to the descrambler 45 if the access rights AR, assigned to the device 40, e.g. to the security module 43, meet the access condition ACm included in the control message ECM 21 which comprises the common stream key CWm.

Figure 7:
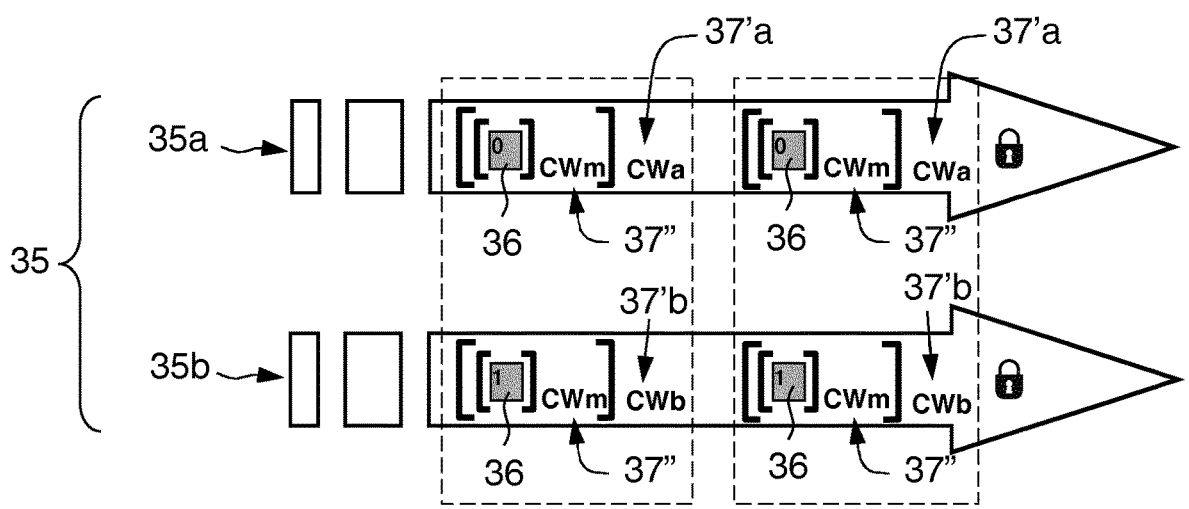

FIG. 7 shows a variant of FIG. 6. Indeed, in the case where a first cryptographic protection and a second cryptographic protection are used to protect the watermarked payload portion 36 of the watermarking data streams 35, the second protection 37" may be preferably applied before the first protection 37'a, 37'b. In this case the first protection 37'a, 37'b may be regarded as an over-encryption of the second protection 37".

According to another embodiment, the main stream 33 received by the input interface 41 is further protected using the common stream key CWm. By stating that the main stream 33 is protected, it should be understood that the payload portions of this main stream are in fact protected using the common stream key CWm, as shown in FIG. 2.

According to a further embodiment, the conditional access streams 30 are packetized streams. As shown in FIG. 1, each packet 4, 14 comprises a header 5, 15 and a payload part 6, 16. For identification and routing purposes, the header 5, 15 remains in clear form so that only the payload part 6, 16 may be protected, e.g. using a cryptographic key.

According to one embodiment the main stream 33 contains impairments and the watermarked payload portions 36 of the watermarking data streams 35 allow to remove these impairments. Preferably, these impairments are visual or hearing impairments, depending on whether the main stream is a video or an audio stream. The impairments have been already disclosed above, regarding the second way to protect a conditional access stream. The impairments can be obtained by modifying any data of the payload of an original stream. For example, modifications may relate to DC and/or AC coefficients, i.e. Constant and/or Alternating coefficients, which are coding elements arranged in blocks within an image. The modifications may also relate to parameters of a coding format defining an image, e.g. quantization coefficients of a quantization matrix also known as quantization table, or motion vectors. The original data, e.g. coefficients or parameters, with their respective positions, i.e. their positions within a bitstream, within the image or within a conversion table for example, can be stored so as to be later used to remove the impairments.

According to a preferred embodiment, the above mentioned impairments are comprised in dummy packets, e.g. the hatched portions of the main stream 33 shown in FIG. 4. The dummy packets can be substituted, by the watermarking unit 47, by corresponding packets e.g. watermarked payload portions 36, from the watermarking data streams 35. Dummy packets may contain dummy data or may refer to empty packets.

According to another embodiment and while referring mainly to FIG. 1 and FIG. 4, at least some packets 4 comprise, in the header 5, at least one synchronization information 8 such as timestamps DTS/PTS that may be used by the watermarking unit 43 to synchronize the processing of the watermarking data streams 35 with the main stream 33 when generating the watermarked stream 39.

As mentioned above regarding one of the embodiments of the present solution, the watermarking data streams 35 further comprise location data assigned to the watermarked payload portions 36 and intended to be used by the watermarking unit 47 to put said watermarked payload portions 36 in predetermined locations within the main stream 33 for generating the watermarked stream 39. Preferably, these location data are included in the headers 5, 15 of the packets 4, 14, 14' which form the packetized conditional access streams 30. Still preferably, these watermarked payload portions 36 are included in the payload part 6, 16 of these packets 4, 14, 14'.

The Server or Content Provider

The server relates to any computer program or device suitable to provide conditional access streams 30 and encrypted control messages 20 to at least one client device 40. This means that the conditional access streams 30 and the encrypted control messages 20 are intended to be subsequently used as input data for generating a watermarked stream 39 embedding a watermarking information 38 as schematically shown in FIG. 4.

Figure 8:
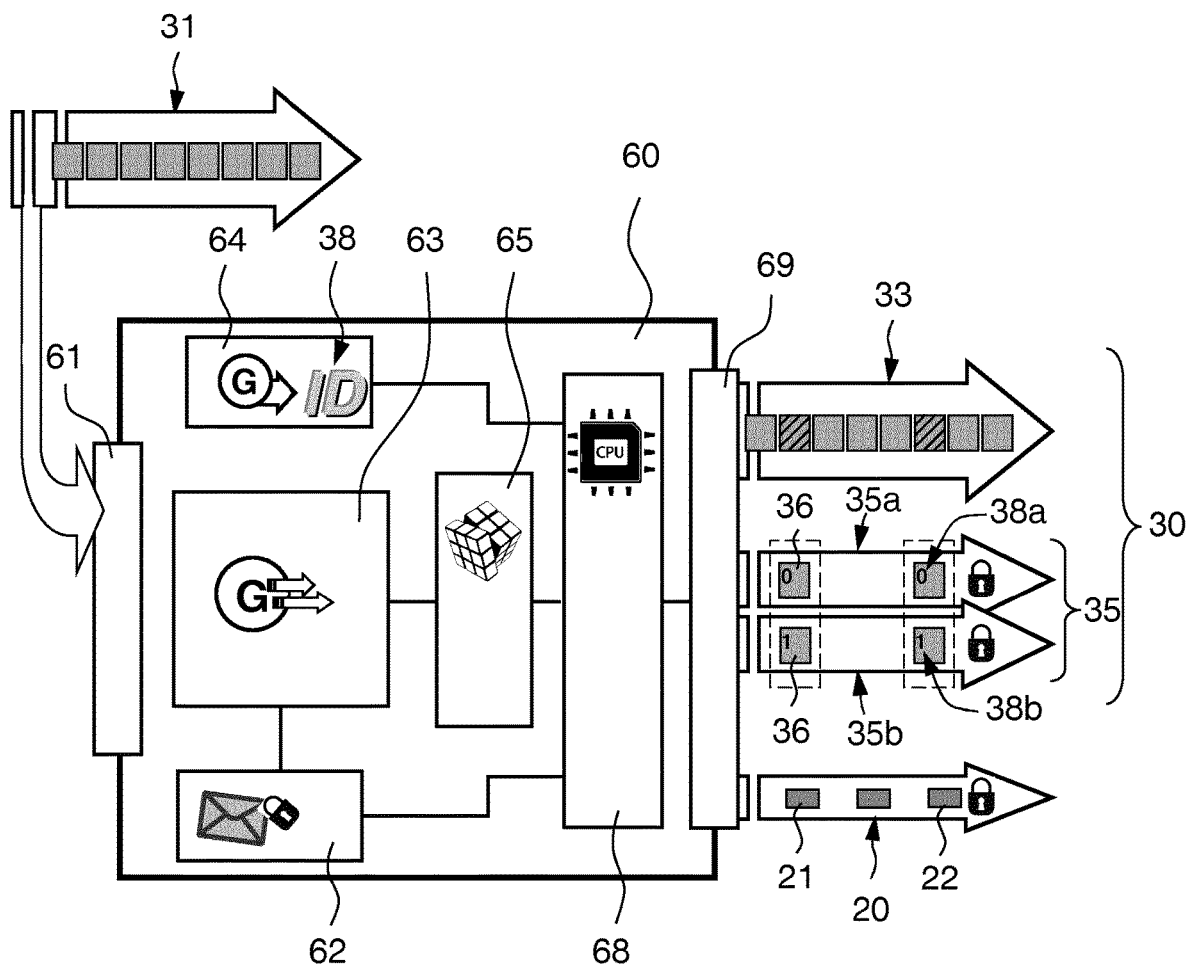
FIG. 8 is a schematic representation of a server of the present solution together with several streams.

FIG. 8 schematically shows an overview of a server 60 configured to provide encrypted control messages 20 and conditional access streams 30 including a main stream 33 and watermarking data stream 35. To this end, the server 60 comprises:

a watermarking information generator 64 configured to provide the watermarking information 38;

a stream generator 63 configured to provide the main stream 33 and the watermarking data streams 35;
a scrambler 65 configured to apply a protection on at least some of the conditional access streams 30;
a message generator 62 configured to provide the control messages 20 with access data AC, AR, suitable to enforce a selective processing of the watermarking data streams 35;
a control unit 68 configured to correlate, through the control messages 20, the selective processing with the watermarking information 38 ID, in order to allow subsequent embedding of the watermarking information ID in the watermarked stream 39, as shown in FIG. 4; and
an output interface 69 configured to output, from the server 60, the control messages 20 and the conditional access streams 30.

The watermarking information 38 may be generated by the watermarking information generator 64, it may be retrieved by the watermarking information generator, for example from a database, or it may be received by the watermarking information generator 64 through an input interface 61 of the server 60.

Similarly, the main stream 33 may be generated by the stream generator 63, it may be retrieved by the stream generator, for example from a database, or it may be received by the stream generator through the input interface 61. Preferably, the main stream is provided by the stream generator 63 on the basis of an original stream 31 which is still preferably received through the interface 61 or retrieved e.g. from a local database. According to the present solution, the stream generator 63 is preferably configured to modify such an original stream 31 by including therein dummy data. Such dummy data are preferably dummy portions as illustrated by the hatched portions in the main stream 33, as those disclosed regarding FIG. 4 for example.

The watermarking data streams 35 provided by the stream generator 63 may comprise payload portions of the original stream 31. Preferably, the watermarking data streams 35 do not differ from those disclosed previously, for example from those disclosed regarding FIG. 4.

According to one embodiment, the watermarking information 38 is information coded in compliance with a numeral system as already disclosed above regarding the device 40 and the selective processing is correlated with this coded information.

By stating that the control unit 68 is configured to correlate, through the control messages 20, the selective processing with the watermarking information 38 it should be understood that the control unit 68 is configured to use and to configure control messages 20 so that a relationship can then be established between the selective processing of the watermarking data streams 35 and the watermarking information 38. Accordingly, the selection of the watermarking data stream 35, which has to be processed, is controlled through information contained in the control messages 20. Moreover, these watermarking data streams 35 are selected, preferably one at a time, in accordance with the watermarking information 38, so that the watermarking information 38 can be embedded into the watermarked stream 39, thereafter and preferably by the device 40.

For example, if the watermarking information 38 is coded in compliance with a base 2, binary system, one of the watermarking data streams 35, e.g. the first watermarking data stream 35a, may contain watermarked payload portions 36 of the original stream 31 and representing a bit "0". Another watermarking data stream 35, e.g. the second watermarking data stream 35b, may contain watermarked payload portions 36 of the original stream 31 and representing a bit "1". Preferably, the payload portions 36 of an n-tuple, e.g. the pair of payload portions 36 shown within the rectangular dashed line in FIG. 8, differ from each other by their watermark 38a, 38b which, in the present example, may be "0" for the payload portions 36 of the first watermarking data stream 35a and may be "1" for the payload portions 36 of the second watermarking data stream 35b. The two watermarking data streams 35a, 35b may be sufficient to embed the watermarking information 38 if the latter is coded in compliance with a binary numeral system. However, more than two watermarking data streams 35 should be also used with such a binary numeral system. For example, three or four watermarking data streams 35 may be used. In this case, two watermarking data streams may represent the watermark "0" and one or two other watermarking data streams may represent the watermark "1". The selection between the watermarking data streams representing the same bit "1" or "0" may be an arbitrary choice or may be dependent from any other algorithm. Although the number of watermarking data stream 35 generated by the stream generator 63 is at least equal to the radix, i.e. the base of the numeral system in which the watermarking information 38 is coded, it remains more efficient to have a number of watermarking data streams 35 that does not exceed the radix of this numeral system.

Preferably, the stream generator 63 is configured to generate the watermarking data streams 35 by watermarking some payload portions 36 of the original stream 31 with watermarks 38a, 38b. Furthermore, these watermarks are specific, e.g. unique, to each watermarking data stream 35.

While reverting to the example mentioned above where the watermarking information 38 is a four bit binary number, such as "1001", each of these four bits may correspond to a watermark 38a, 38b embedded in the watermarked payload portions 36. For example, the watermarked payload portions 36 of the first watermarking data stream 35a may each comprise the watermark "0" and the watermarked payload portions 36 of the second watermarking data stream 35b may each comprise the watermark "1". Depending on the length of the watermarked payload portions 36, the four bit binary number "1001" may be embedded in the watermarked stream 39 using at least four watermarked payload portions 36. Preferably, several watermarked payload portions 36 comprising the watermark "1" are successively embedded in the watermarked stream 39 for identifying the first bit of the binary number "1001" and the same is true for the other three bits of the binary number "1001". In addition, it should be kept in mind that the watermark "1" is not limited to a single bit, but may comprise a plurality of bits identified as being the watermark "1" 38b. The same is true for any watermark, including the watermark "0" 38a.

For example, if each watermarked payload portion 36 corresponds to an image, i.e. frame, of a video stream, the bit "1" corresponding to the first bit of the binary number "1001" may be watermarked in the watermarked stream 39 using watermarked payload portions 36 of the second watermarking data stream 35b during a time interval e.g. equivalent to ten seconds. During the next ten seconds the watermarked stream 39 may be watermarked using the watermarked payload portions 36 of the first watermarking data stream 35a, corresponding to the bit "0", and so on for each of the other bits of the binary number "1001".

Once the binary number "1001" has been entirely watermarked into the watermarked stream 39, the same process can be repeated until reaching the end of the watermarked stream 39. According to one embodiment, the watermarked stream 39 may include a time interval between two successive watermarking information 38 "1001", so that a watermarking information 38 may be embedded in the watermarked stream 39 every 5 or 10 minutes, for example. This time interval may be shorter or longer and may also vary, so that the watermarking information 38 is not necessarily embedded at regular time interval within the watermarked stream 39. The number of times the watermarking information 38 is embedded in the watermarked stream 39 may depend on the length of the watermarked stream 39 or of the original stream 31.

Preferably, each watermarked payload portion 36 corresponds to a small part of the original stream 31, for example a small part of an image, i.e. frame such as some bits of a frame. Preferably, the watermarked payload portions 36 correspond to the original portions of the original stream 31 which have been modified so as to introduce impairments in the main stream 33. These impairments have been already discussed regarding the device 40.

According to a further embodiment, the stream generator 63 is configured to generate the watermarking data streams 35 by further including location data assigned to the watermarked payload portions 36. These location data are intended to put the watermarked payload portions 36 in predetermined locations within the main stream 33 for generating the watermarked stream 39 thereafter, preferably by the device 40. As already mentioned, location data can refer to a time basis, e.g. a counter or timestamps, or to any other reference system, e.g. using markers or counting data.

According to another embodiment, the main stream 33 is derived from the original stream 31 and the stream generator 63 is configured to put, in the main stream 33, dummy portions instead of some payload portions of the original stream 31. Accordingly, the main stream 33 preferably differs from the original stream 31 in that the main stream 33 comprises these dummy portions.

Preferably, these dummy portions contain impairments, and the watermarked payload portions 36 of the watermarking data streams 35 allow to remove these impairments. Still preferably, these impairments are visual or hearing impairments, depending on whether the main stream is a video stream or respectively an audio stream. More specifically, such a removing may be obtained by the fact that the watermarked payload portions 36 contain the relevant payload portions of the original stream 31 or are derived from this original stream.

Figure 5:
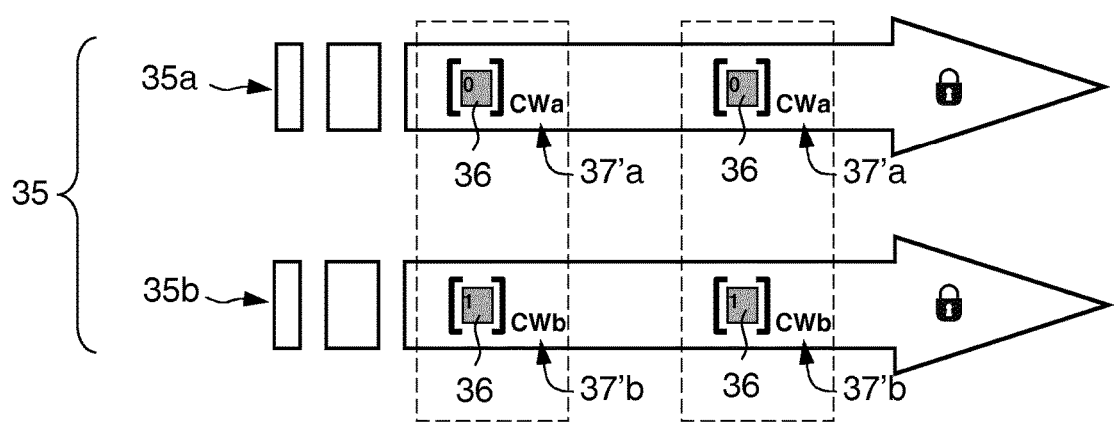
FIGS. 5 to 7 schematically show two watermarking data streams protected according to three various embodiments.

According to another embodiment, in order to correlate the selective processing with the coded information, i.e. with the watermarking information 38 coded in compliance with the numeral system, the stream generator 63 is further configured to apply a first cryptographic protection 37'*a*, 37'*b* to the watermarking data streams 35 using a specific stream key CWa, CWb which is preferably unique to each watermarking data stream 35*a*, 35*b* (as shown e.g. in FIG. 5. Furthermore, the message generator 62 is further configured to generate, for each specific stream key CWa, CWb, dedicated control messages 21 as shown in FIG. 3 comprising access conditions AC associated to the specific stream key CWa, CWb and to generate further control messages 22 as shown in FIG. 3 comprising access rights AR. The access to the specific stream key CWa, CWb is granted if the access rights AR meet the access conditions AC associated to the specific stream key. Further details, applicable to the server 60, have been already disclosed in reference to FIG. 5 in connection to the device 40.

According to another embodiment partially shown in FIG. 6 or in FIG. 7, the stream generator 63 is further configured to apply a second cryptographic protection 37" to the watermarking data streams 35 using a common stream key CWm included in some of the control messages 20, preferably in entitlement control messages 21. Furthermore, the message generator 62 may be configured to generate, for this common stream key CWm, dedicated control messages 21 as shown in FIG. 3 comprising access conditions AC assigned to this common stream key CWm, and to generate control messages 22 as shown in FIG. 3 comprising access rights AR. Moreover, the access to the common stream key CWm is granted if the access rights AR meet the access conditions AC assigned to this common stream key CWm.

In one embodiment, the stream generator 63 may be further configured to protect the main stream 33 using the common stream key CWm.

As already mentioned regarding the conditional access data architecture disclosed above, each of these stream keys CWa, CWb, CWm may be a control word and therefore may be valid for a limited time interval, for example for one crypto-period.

In one embodiment, the stream generator 63 is further configured to generate the conditional access streams 30 so as to form packetized streams 3, 9, each packet comprising a header 5, 15 and a payload part 6, 16, as shown in FIG. 1. Furthermore, the header 5, 15 of packets 4, 14, 14' is intended to remain in a clear form.

Referring to the stream architecture mentioned at the beginning of the present description, preferably at least some packets 4 comprise, in the header 5, synchronization information 8. For example, such synchronization information 8 may refer to at least one timestamps DTS/PTS to be used to synchronize the processing of the watermarking data streams 35 with the main stream 33 when generating the watermarked stream 39. Accordingly, the synchronization of PES packets 4 within the TS packets 14 may be provided by DTS and/or PTS timestamps or by Program Clock Reference PCR or Original Program Clock Reference OPCR timestamps which are located within PES packets 4. Given that such a PES packet 4 is typically used to convey a watermarked payload portion 36, which may be equivalent to few bits only, this dedicated packet 4 will probably carry less data than an usual PES packet could carry. For this reason, the packet 4 containing the watermarked payload portion 36 and the synchronization information 8 preferably meets a private format. Such a private format remains compliant with the original syntax of PES packet, e.g. according to MPEG standard, so that any decoder remains able to interpret and to process PES packets having such a private format.

According to another embodiment, location data and watermarked payload portions 36 are respectively included in the header 5 and in the payload part 6 of the packets 4 of the watermarking data streams 35.

As already mentioned above regarding the stream architecture, the packetized elementary stream 3 including the PES packet 4 is further segmented so as to form TS packets 14. Although, this feature is not critical for the understanding of the present solution, it should be understood that the server 60 may be further configured to obtain such TS packets 14 from any packetized elementary stream 3. In addition, it should be also understood that the server 60 may further comprise a multiplexer to multiplex any streams that have to be output from the output interface 49, typically in order to be sent towards the device(s) 40. In such a case, it should be also understood that the device(s) 40 may be provided with a demultiplexer, so as to carry out the reverse operation.

Reverting to the stream generator 63, it should be noted that the main stream 33 and the watermarking data streams 35 may be generated according to various embodiments.

The payload portions of the watermarking data stream 35 may be obtained by modifying at least one bit of the corresponding original payload portion of the original stream 31. In addition, it should be noted that there is no requirement to modify the same data when generating the watermarking data streams 35. Although the n-tuple of watermarked payload portions 36 within each of the rectangles in dashed lines have been represented in FIG. 4 to FIG. 9 so as to relate to the same data for the sake of understanding, it should be understood that this is not a requirement.

To generate each watermarking data stream 35, it may be possible to copy the original stream 31, while modifying some original payload portions so as to obtain the watermarked payload portions 36. Once the watermarking data streams 35a, 35b have been generated, each of them can be considered as a variant of the original stream 31. Then, in order to generate the main stream 33, the stream generator 63 may compare the watermarking data stream 35a with the watermarking data stream 35b. This comparison may be achieved payload portion by payload portion. From this comparison, the payload portions which are identical may be used to generate the payload portions of the main stream 31. Each time the comparison shows a payload portion difference, a dummy portion may be placed in the main stream 31. At the end of the comparison process, the main stream 33 will be generated and will comprise a dummy portion each time a payload portion 36 will have to be extracted from one of the watermarking data streams 35. As the identical portions between the watermarking data streams 35a and 35b have been placed in the main stream 31, there is no interest to keep these identical portions in the watermarking data streams 35. For this reason, the identical portions are preferably removed from the watermarking data streams 35a, 35b. Therefore, the watermarking data streams 35 will only contain the watermarked payload portions 36 that will have to be placed in the main stream 33 instead of the dummy portions. Advantageously, each watermarking data stream 35 will contain far less data than the main stream 33.

It should be kept in mind that these portions i.e. payload portions, watermarked payload portions, dummy portions, may be data packets, for example PES packets, TS packets and in particular payload portions of such packets.

Before generating the main stream 33 by comparing the watermarking data streams 35 between them, the watermarking data streams 35 may be protected, e.g. using a cryptographic protection according to any of the embodiments shown in FIG. 5 to FIG. 7. Alternatively, the protection of the watermarking data streams 35 may be performed after having generated the main stream 33, for example after having removed the identical portions from the watermarking data streams 35a, 35b when these watermarking data streams 35 are compared between them.

Although these examples have been based on two watermarking data streams 35a, 35b, it is clear that the number of watermarking data streams may be higher. In addition, main stream 33 and/or the watermarking data stream 35 may be still obtained in different ways. For example, the main stream 33 may be generated first on the basis of the original stream 31, e.g. by replacing some payload portions of the main stream 31 by dummy portions and keeping the original portions so as to generate the watermarking data streams 35.

In addition, although a single server 60 has been disclosed to perform several different tasks, e.g. generating the streams, generating the control messages, performing encryptions, etc . . . , it should be noted that at least some of these tasks may be carried out by more than one server or dedicated unit without departing from the spirit of the present solution.

A System for Generating a Watermarked Stream

Figure 9:
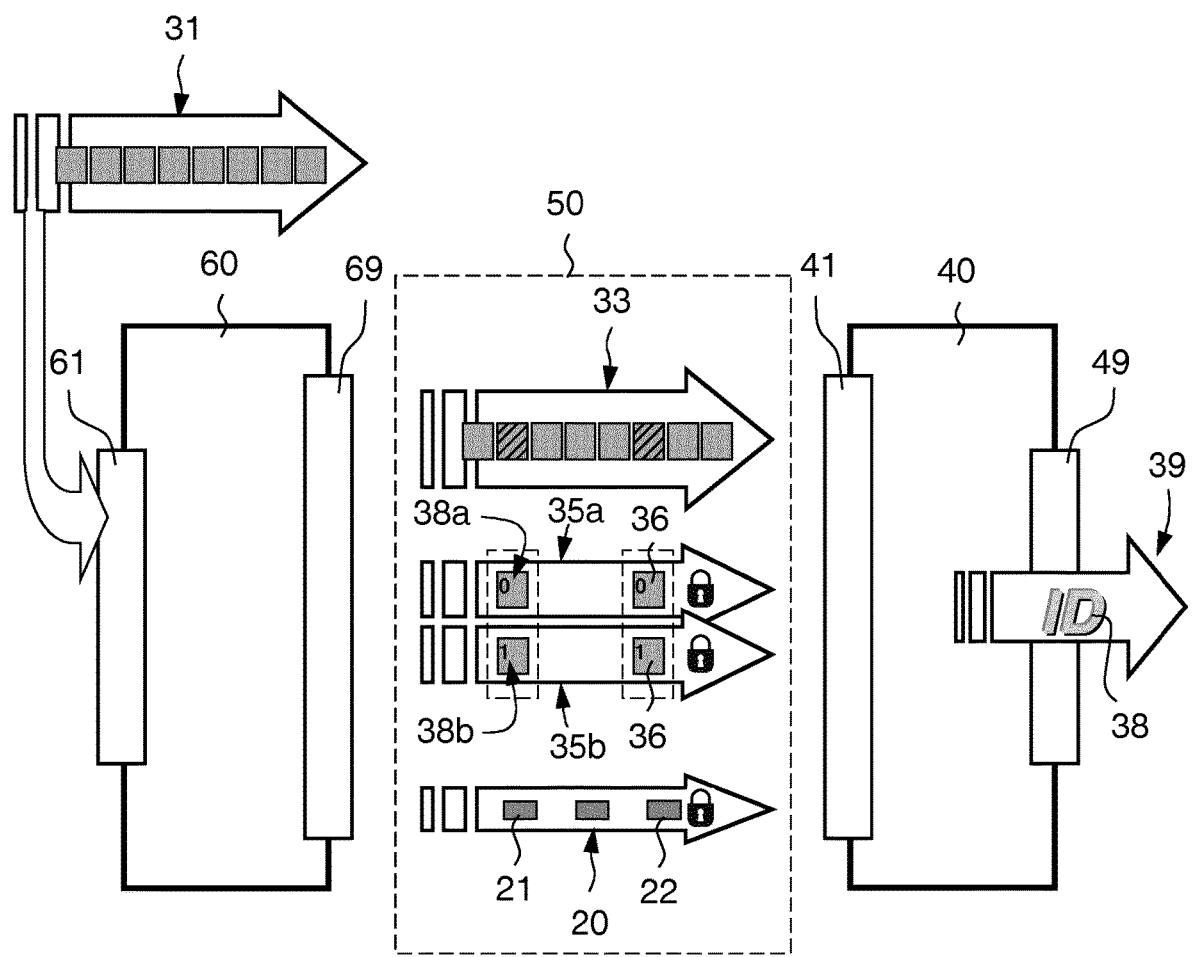
FIG. 9 is a schematic representation of a system for generating a watermarked stream in accordance with the present solution.

The present solution also relates to a system for generating a watermarked stream as schematically shown in FIG. 9. This system comprises a device 40, according to any of the embodiments disclosed above when describing this device, and a server 60, according to any of the embodiments disclosed above when describing this server. The encrypted control messages 20 and the conditional access streams 30 may be transmitted from the server 60 to the device 40 through any communication means 50. Such communication means 50 may be any type of data link, for example a satellite link (e.g. DVB-S), a terrestrial wireless link, e.g. Digital Video Broadcasting—terrestrial DVB-T, through terrestrial antennas, a cable link, e.g. Digital Video Broadcasting—Cable DVB-C, an internet link, e.g. Digital Video Broadcasting—DVB-Internet Protocol or a handheld link, e.g. Digital Video Broadcasting—handheld DVB-H such as that used for mobile phone communications for instance.

Preferably, the communication means 50 is compliant with broadcasting. Nevertheless, any other routing scheme remains also applicable.

A Method for Generating a Watermarked Stream

Figure 10:
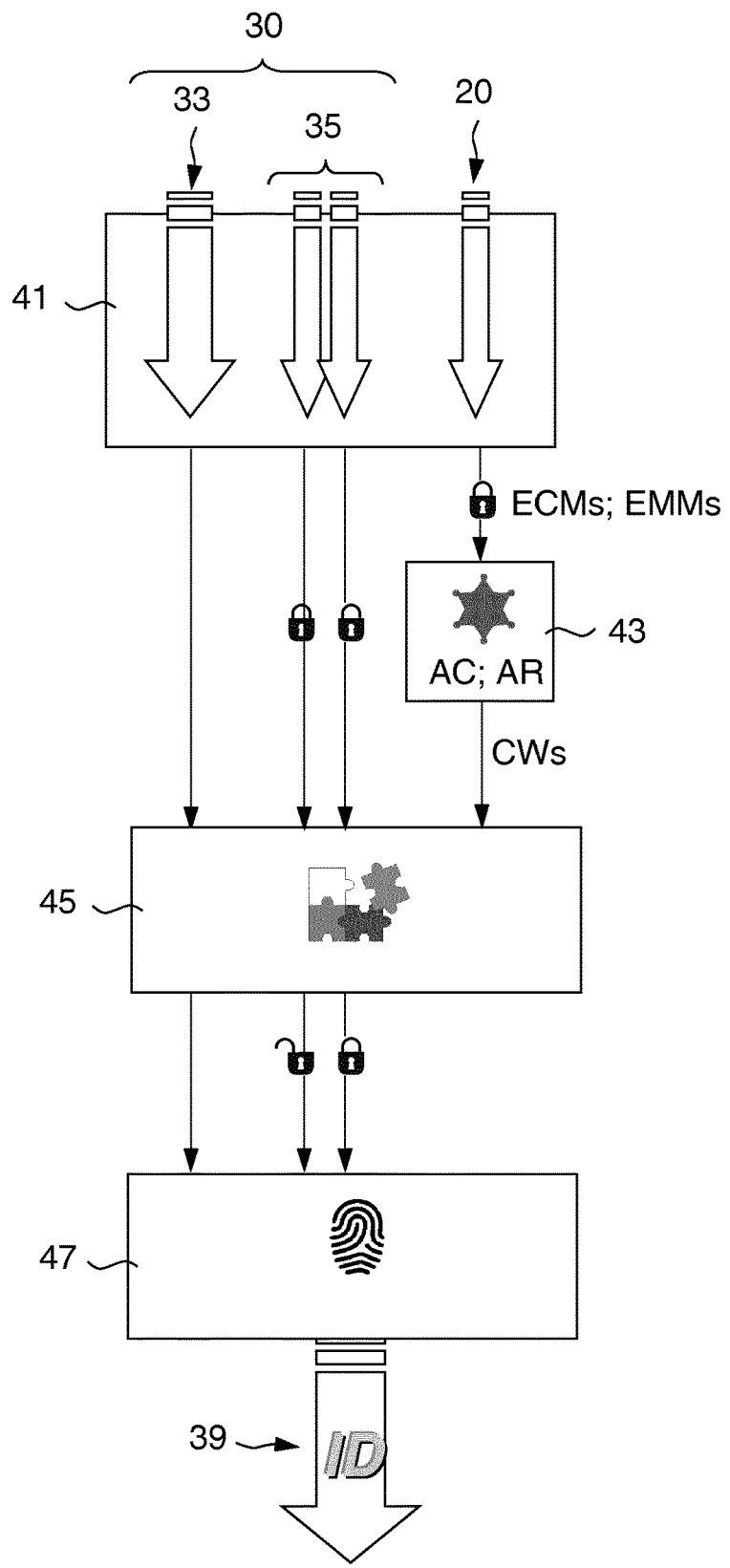
FIG. 10 is a flow chart example of a method for generating a watermarked stream according to the present solution.

Referring more specifically to FIG. 10, the present solution also relates to a method for generating a watermarked stream 39 in a device 40 suitable to receive encrypted control messages 20 and conditional access streams 30. As shown in the previous Figures, the conditional access streams 30 include a main stream 33 and watermarking data streams 35 from which a watermarking information 38 can be embedded in the watermarked stream 39.

This method comprises:
processing, in a security module 43 of the device 40, at least some of the aforementioned control messages 20 for retrieving access data AC and/or AR therefrom,
removing protection applied on at least some of the aforementioned conditional access streams 30;
selectively processing the watermarking data streams 35 depending on the access data AC and/or AR, in order to generate the watermarked stream 39 from the conditional access streams 30.

As already explained regarding the previous Figures, the protection applied on at least some of the conditional access streams 30 may refer to a cryptographic protection. Such a cryptographic protection is for example already applied to the control messages 20, since these messages are received in an encrypted form. From these control messages 20 (ECMs, EMMs), the security module is able to extract some control words CWs and to check if the access conditions AC assigned to these CWs match the access rights AR assigned to the device 40. In positive outcome, the relevant CWs are transmitted by the security module 43 to the descrambler 45 as schematically depicted in FIG. 10. As the descrambler also receives the conditional access streams 30 from the input interface 41, it will be able to descramble some of the conditional access streams 30 depending on the CWs that it has received. Preferably, the descrambler will receive a CW for decrypting one of the watermarking data streams 35. This is schematically shown by the opened padlock on one of the watermarking data streams 35 outputted from the descrambler 45, whereas the other watermarking data stream 35 remains inaccessible, as shown by the other padlock which remains locked.

Finally, the watermarking unit 47 will be able to generate the watermarked stream 39 from the main stream 33 and the watermarking data stream 35, typically from the unprotected watermarking data stream. In other words, the watermarking unit 47 will selectively process the watermarking data streams 35 depending on the access data, e.g. AC, included in some of the control messages 20, since only the access conditions AC which meet the access rights AR allows the watermarking unit 47 to receive conditional access streams 30 in an unprotected form. Thus, in the example shown in FIG. 10, the watermarking unit 47 has no other choice than using the main stream 33 and the unprotected watermarking data stream to generate the watermarked stream 39, since the other watermarking data stream 35 remains protected.

The access rights AR are received through EMM messages 22 from the server 60. EMM messages 22 are typically messages dedicated to a specific device 40. By changing or by updating the access rights AR received through EMM messages 22, the server 60 can force the device 40, e.g. the watermarking unit 47, to access to a specific watermarking data stream 35. Since each watermarking data stream 35 preferably contains a specific watermark 38a, 38b, the server 60 can remotely control the appropriate watermark that has to be embedded in some payload portions of the watermarked stream 39, e.g. during a certain time interval. By changing again the access rights AR assigned to the device, e.g. through a new EMM message, the sever 60 may force the watermarking unit 47 to use the other watermarking data stream 35 for example. Accordingly, the server 60 can force the watermarking unit 47 to switch from one watermarking data stream 35 to another one. Such a switching process is performed depending on the watermarking information 38 to embed in the watermarked stream 39, while knowing that the watermarking information 38 is coded according to a predefined numeral system, e.g. a binary numeral system, a ternary numeral system, etc . . . .

Preferably, the number of watermarking data streams suitable to be processed in this method is at least equal to a radix or base of the numeral system in which the watermarking information 38 is coded.

According to one embodiment, the watermarking data streams 35 comprise, i.e. are made of watermarked payload portions 36 of an original stream 31, as shown e.g. in FIG. 4 and FIG. 7. These watermarked payload portions 36 include watermarks 38a, 38b, such as watermarks representing a binary information "1" or "0", which are specific to each watermarking data stream 35.

According to another embodiment, the watermarking data streams 35 further comprise location data assigned to the watermarked payload portions 36. In addition, the watermarked payload portions 36 are placed at these location data within the main stream 33, when the watermarked stream 39 is generated. Such location data do not differ from the location data mentioned regarding the other objects of the present solution.

Preferably and as explained above regarding FIG. 10, the watermarking information 38 is progressively embedded in the watermarked stream 39 by successively processing the watermarking data streams 35 when generating the watermarked stream 39.

More specifically, the device 40 of the present method may be provided with access rights AR and some of the control messages 20 may comprise access conditions AC to control access to at least some of said conditional access streams 30. In addition access to the conditional data streams 30 is granted if the access rights AR meet access conditions AC obtained by way of some of the control messages 20.

Preferably, the access to the control messages 20 is restricted to the security module 43. Furthermore and as show in FIG. 5, the watermarking data streams 35 are protected by a first cryptographic protection 37'a, 37'b using a specific stream key CWa, CWb included in some of the control messages 20, e.g. in dedicated ECMs messages. Preferably, the specific stream key CWa, CWb is unique to each watermarking data stream 35. Moreover, the control messages 20 are decrypted by the security module 43 and the specific stream key CWa, CWb is transmitted to a descrambler 45 of the device 40 by the security module 43 if the access rights AR, assigned to this device 40, e.g. assigned to the security module 43, meet the access condition AC included in the control message 20, e.g. in the ECM 21 which comprises the specific stream key CWa, CWb. Furthermore, the access to the access rights is restricted to the security module 43.

Still preferably and as better shown in FIG. 6 and FIG. 7, the watermarking data streams 35 are further protected by a second cryptographic protection 37" using a common stream key CWm included in some of said control messages 20, typically in ECM messages 21. Moreover, the common stream key CWm is transmitted to the descrambler 45 by the security module 43 if the access rights AR of the device 40 meet the access condition AC included in the control message 20 which comprises the common stream key CWm.

According to one embodiment, the main stream 33 received by the device 40 is further protected using the common stream key CWm.

In one embodiment, the conditional access streams 30 are packetized streams. As shown in FIG. 1, each packet 4, 14, 14' comprises a header 5, 15 and a payload part 6, 16. For identification and routing purposes, the header 5, 15 remains in clear form so that only the payload part 6, 16 may be protected, e.g. using a cryptographic key.

In a further embodiment, the main stream 33 contains impairments, and the watermarked payload portions 36 of the watermarking data streams 35 allow to remove these impairments. Preferably, these impairments are visual or hearing impairments, depending on whether the main stream is a video or an audio stream.

Still preferably, these impairments are comprised in dummy packets which are replaced by packets from the watermarking data streams 35 when the watermarked stream 39 is generated.

According to another embodiment and while referring mainly to FIG. 1 and FIG. 4, at least some packets 4 comprise, in the header 5, at least one synchronization information 8 such as timestamps DTS/PTS/PCR/OPCR that may be used by the watermarking unit 43 to synchronize the processing of the watermarking data streams 35 with the main stream 33 when generating the watermarked stream 39.

According to another embodiment, location data and watermarked payload portions 36 are respectively included in the header 5 and in the payload part 6 of the packets 4 comprised in the watermarking data streams 35.

Figure 11:
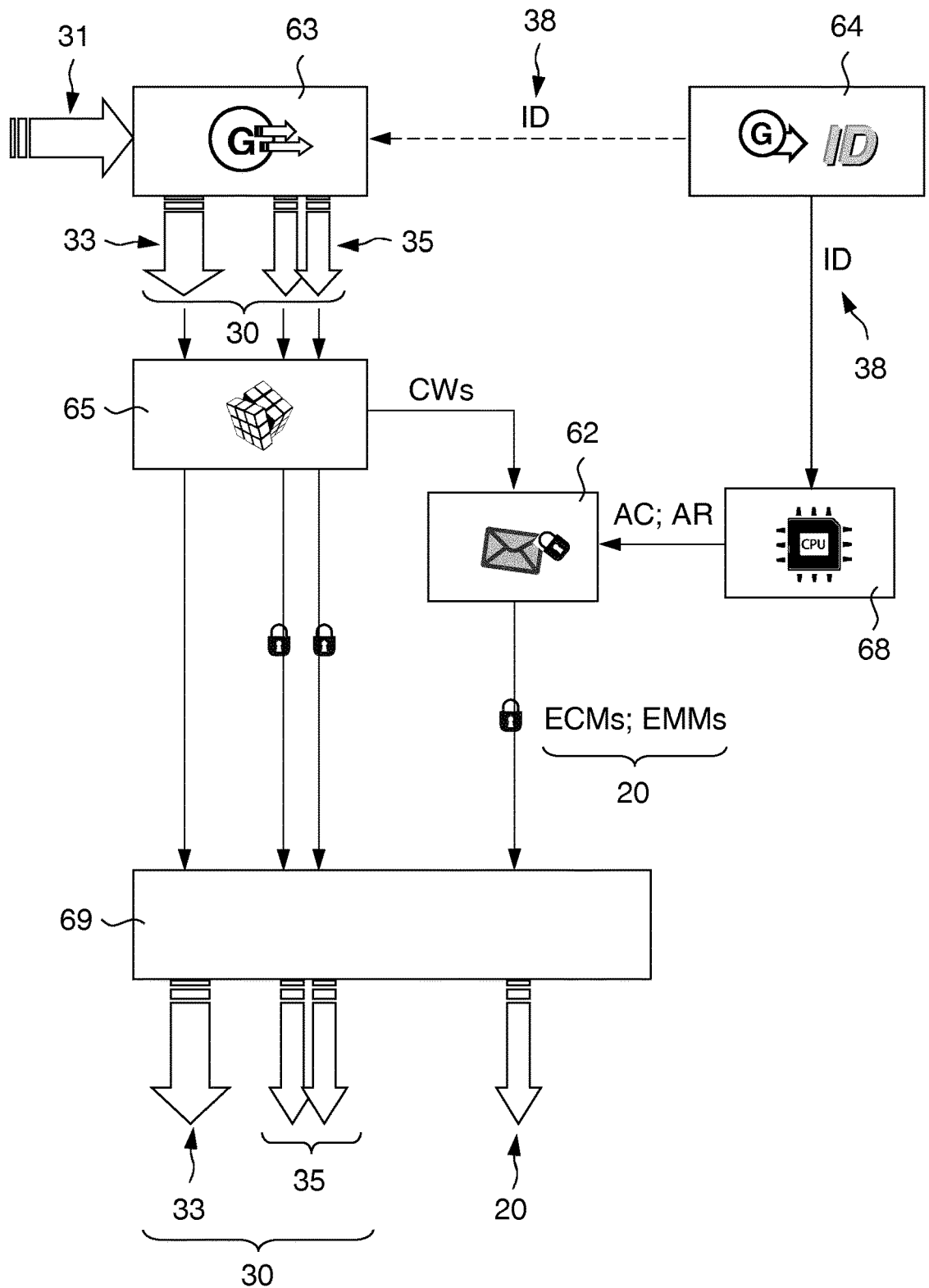
FIG. 11 is a flow chart example of a method for providing conditional access streams and encrypted control messages for watermarking purposes.

A Method for Providing Conditional Access Streams and Encrypted Control Messages Referring more specifically to FIG. 11, the present solution also relates to a method for providing conditional access streams 30 and encrypted control messages 20. These conditional access streams 30 and encrypted control messages 20 being intended to be subsequently usable as input data for generating a watermarked stream 39 embedding a watermarking information 38.

This method comprises:

providing the watermarking information 38;

providing the main stream 33 and the watermarking data streams 35;

protecting at least some of these conditional access streams 30;

providing the control messages 20 with access data suitable to enforce a selective processing of the watermarking data streams 35;

correlating, through these control messages 20, the selective processing with the watermarking information 38, in order to allow subsequent embedding of the watermarking information 38 in the watermarked stream 39; and outputting the control messages 20 and the conditional access streams 30, so as to allow subsequent generation of the watermarked stream 39 therefrom.

The step aiming to provide the watermarking information 38 may be performed through different ways. For example, the watermarking information 38 may be generated by the watermarking information generator 64, as shown in FIG. 11. According to another way, the watermarking information may be retrieved from a database or may be received by the server 60, in particular by the watermarking information generator 64, from an external source via the input interface 61 of the server 60 as shown in FIG. 7.

Similarly, the step aiming to provide the main stream 33 may be performed by generating this main stream 33 at the stream generator 63. Preferably, the main stream 33 is generated from an original stream 31 received as input data by the stream generator 63. The original stream 31 may be retrieved from a database which may be internal or external to the server 60.

By providing control messages 20 with access data suitable to enforce a selective processing of the watermarking data streams 35 it should be understood that such an enforcement is intended to be performed at the client side, for example within the device 40. The control messages 20 used to this end may be ECM messages and/or EMM messages. Typically, the ECM messages convey access conditions AC that will either allow or prevent the security module 43 to transmit the control word, i.e. the CW attached to these access conditions AC within the same ECM message, to the descrambler 45 of the device 40. Accordingly, data suitable to enforce the selective processing of the watermarking data streams 35 may refer to the access conditions AC. As the transmission of the control words CWs to the descrambler depends on the result of the comparison of the access conditions AC with access rights AR assigned to the device 40, and as these access rights AR are provided by the server 60 to the device 40 through EMM messages as shown in FIG. 3, therefore the server 60 may also provide new access rights AR to the device 40, so as to allow or prevent the security module 43 to transmit the relevant control word to the descrambler of the device 40. Therefore, the data suitable to enforce the selective processing of the watermarking data stream 35 may be regarded as the access rights AR and/or access conditions AC.

The correlation of the selective processing with the watermarking information 38 does not differ from that already explained in connection with the server 60.

According to one embodiment, the watermarking information 38 is information coded in compliance with a numeral system and the selective processing is correlated with the coded information.

Preferably, the number of provided watermarking data streams 35 is at least equal to the radix, i.e. the base, of the numeral system in which the watermarking information 38 is coded.

According to one embodiment, the watermarking data streams 35 are generated by watermarking some payload portions of an original stream 31 with watermarks 38$a$, 38$b$. These watermarks may be specific, e.g. unique to each watermarking data stream 35. For example, according to a binary numeral system, these watermarks may include watermarks 38$a$ representing a bit "0" and watermarks 38$b$ representing a bit "1", so as to have two types of watermarks, in particular one type for the payload portions of a first watermarking data stream 35$a$ and another type for the payload portions of a second watermarking data stream 35$b$ as shown in FIG. 7.

According to another embodiment, the watermarking data streams 35 further include location data assigned to the watermarked payload portions 36. Such location data do not differ from those already disclosed in the present description and therefore are also intended to place the relevant watermarked payload portions 36 in predetermined locations within the main stream 33 for generating the watermarked stream 39.

In one embodiment, the main stream 33 is preferably derived from the original stream 31 and is generated so as to comprise dummy portions, e.g. hatched portions shown in FIG. 4, FIG. 8 and FIG. 9, instead of some payload portions of the original stream 31. Accordingly, the main stream 33 preferably differs from the original stream 31 in that the main stream 33 comprises these dummy portions.

Still preferably, these dummy portions contain impairments and the watermarked payload portions 36 of the watermarking data streams 35 allow to remove these impairments. As already mentioned, these impairments may be for example visual or hearing impairments, depending on whether the main stream is a video or respectively an audio stream.

According to one embodiment, to correlate the selective processing with the coded information, a first cryptographic protection 37'$a$, 37'$b$ is applied to the watermarking data streams 35 using a specific stream key CWa, CWb, preferably unique to each watermarking data stream 35. Furthermore, for each specific stream key CWa, CWb, dedicated control messages 20, e.g. ECMs 21, are generated so as to comprise access conditions AC assigned to this specific stream key CWa, CWb, and further control messages, e.g. EMMs 22, are generated so as to comprise access rights AR. The access to the specific stream key CWa, CWb is granted if the access rights AR meet the access conditions AC associated to the specific stream key CWa, CWb.

According to another embodiment, a second cryptographic protection 37" may be applied to the watermarking data streams 35 using a common stream key CWm, as better shown e.g. in FIG. 6 and FIG. 7. The common stream key CWm may be included in some of the control messages 20, typically in ECM messages 21. Moreover, for this common stream key CWm, dedicated control messages 20, e.g. ECMs 21, may be generated so as to comprise access conditions AC assigned to the common stream key CWm. Furthermore, control messages, e.g. EMM 22 may be generated so as to comprise access rights AR. Accordingly, the access to the common stream key CWm may be granted if the access rights meet the access conditions AC assigned to the common stream key CWm.

In one embodiment, the main stream 33 may be further protected using the common stream key CWm.

Preferably, the conditional access streams 30 are generated so as to form packetized streams 3, 9. Each packet may comprise a header 5, 15 and a payload part 6, 16, as shown in FIG. 1. Furthermore, the header 5, 15 of packets 4, 14 is intended to remain in a clear form.

According to another embodiment and while referring mainly to FIG. 1 and FIG. 4, at least some packets 4 may comprise, in the header 5, at least one synchronization information 8 such as timestamps DTS/PTS that may be used by the watermarking unit 43 to synchronize the processing of the watermarking data streams 35 with the main stream 33 when generating the watermarked stream 39.

In one embodiment, location data and watermarked payload portions 36 may be respectively included in the header 5 and in the payload part 6 of the packets 4 comprised in the watermarking data streams 35.

Final Considerations

Advantageously, the present solution can be easily implemented in devices, servers or systems working with ECM and EMM messages as condition access means to access multimedia content. Although conditional access approach is usually not designed for watermarking purposes, the present solution takes advantage of the architecture of such an approach in order to watermark multimedia content on the client side.

Still advantageously, such watermarking remains under control of the server even if the watermarking information is embedded at the client device. In other words, even if the client device would be corrupted by fraudulent means aiming to prevent the watermarking, such fraudulent means will remain inefficient. Indeed, the data which control the watermarking operation are provided by the server and are transmitted to the client device through encrypted control messages which have to be processed by a security module within the client device. As the security module is reputed as being inviolable, there is no possibility for a malicious person to bypass the security module or to modify the encrypted control messages.

Still advantageously, the client device and even the security module remain unaware about the watermarking information that has to be embedded in the watermarked stream. Indeed, the watermarking information to embed in the stream is selected by the server so that neither the device, nor its security module, can know such information. In addition, the watermarking information can be progressively embedded in the watermarked stream by successively processing the watermarking data streams when generating the watermarked stream. Advantageously, the watermarking information can never find in a single data block, e.g. in the form of a single data string, within the client device, but it remains in a dispersed form through watermarked payload portions which are successively provided to the client device within a least two distinct watermarking data streams. Such features allow to significantly increase the security of the information watermarked in the multimedia content, because any malicious person remains unable to know in advance what is the watermarking information embedded in such content. Within the client device, this information appears as diluted due to its segmentation in several data packets which are gradually processed by the client device from more than one watermarking data stream. Thus, it becomes very difficult to discover such information from a watermarked content without really knowing what is the information sought.

Still advantageously, as the watermarking solution is based on a common conditional access approach (using access conditions and access rights), this solution is very convenient to implement for broadcasting content, or generally speaking for transmitting content to a plurality of end user devices. In addition, the present solution remains compatible with other routing scheme, such the video-on-demand scheme, and is fully adapted for live or delayed transmissions.

It should also be noted that the present solution does not suggest watermarking an original stream, since the original stream is not transmitted from the server to the client device. By contrast, the present solution generates the watermarked stream from a main stream and from additional watermarking data streams, each of the latter containing watermarked payload portions of the original stream. As the main stream may contain dummy portions, this main stream can be regarded as being a degraded stream compared to the original stream. Consequently, the client device necessarily needs to use one of the watermarking data streams in order to recover the original stream from the main stream. Advantageously, this also means that to provide the original stream at the output of the client device, the latter has to use the watermarked payload portions of the watermarking data streams. Therefore, the watermarking operation cannot be bypassed if the end-user wants to obtain a stream equivalent to the original stream at the output of the client device.

Still advantageously, as the main stream may be degraded compared to the original stream, there is no requirement to encrypt the main stream delivered to the end-users. In this case, the access conditions ACa, ACb associated to the specific stream keys CWa, CWb may further comprise the access condition ACm associated to the common stream key CWm. The visual or hearing impairments that make degradations in the main stream can be regarded as a protection applied to the content provided to the end users. Advantageously, such impairments may provide a protection scalability, for example by varying the degradation level of the main stream. Indeed, the present solution providing, through the main stream, a content which may be more or less degraded. Still advantageously, the degradation of the main stream may also vary along the main stream. For example, the first ten minutes of a movie may be provided in a clear form, i.e. without degradation, while the main part of the movie may comprise impairments. In this way, the end-user may be incited to continue watching the movie in a clear form, which will automatically lead to the watermarking of this movie with watermarking information dedicated to this end-user and/or to the client device.

Although an overview of the inventive subject matter has been described with reference to specific example embodiments, various modifications and changes may be made to these embodiments without departing from the broader spirit and scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The invention claimed is:
1. A device for generating a watermarked stream, comprising:
   at least one input interface configured to receive encrypted control messages and conditional access streams including a main stream comprising payload portions of an original stream and payload portions comprising impairments, and protected watermarking data streams comprising watermarked payload portions of said original stream and said watermarked payload portions including watermarks which are specific to each watermarking data stream, from which a watermarking information can be embedded in the watermarked stream;
   a security module configured to process said control messages and to control access to said conditional access streams;
   a descrambler configured to remove protection applied on at least some of said conditional access streams;
   a watermarking unit configured to generate the watermarked stream from said conditional access streams by selectively processing said watermarking data streams depending on access data included in some of said control messages, and wherein the selectively processing comprises:
   accessing a watermarking data stream selected according to the access data included in said control messages;
   generating the watermarked stream by removing the impairments of the main stream by replacing one or more payload portions of the main stream with a watermarked payload portion of the original stream from said selected watermarking data stream.
2. The device of claim 1, wherein the number of watermarking data streams suitable to be processed by said device is at least equal to a radix of a numeral system in which the watermarking information is coded.
3. A server for providing conditional access streams and encrypted control messages, subsequently usable as input data for generating a watermarked stream embedding a watermarking information, comprising:
   a watermarking information generator configured to provide said watermarking information;
   a stream generator configured to provide said conditional access streams including a main stream comprising payload portions of an original stream and payload portions comprising impairments and watermarking data streams;
   a scrambler configured to apply a protection on at least some of said conditional access streams;
   a message generator configured to provide said control messages with access data suitable to enforce a selective processing of said watermarking data streams;
   a control unit configured to correlate, through said control messages, said selective processing with said watermarking information, to provide subsequent embedding of said watermarking information in the watermarked stream; and
   an output interface configured to output, from the server, said control messages and said conditional access streams,
   wherein the stream generator is configured to generate said watermarking data streams by watermarking some payload portions of an original stream with watermarks specific to each watermarking data stream.

4. The server of claim 3, wherein said watermark information is information coded in compliance with a numeral system; said selective processing being correlated with said coded information.
5. The server of claim 4, wherein the number of watermarking data streams generated by the stream generator is at least equal to a radix of the numeral system in which the watermarking information is coded.
6. A method for generating a watermarked stream in a device suitable to receive encrypted control messages and conditional access streams, said conditional access streams including a main stream comprising payload portions of an original stream and payload portions comprising impairments and protected watermarking data streams comprising watermarked payload portions of an original stream and said watermarked payload portions including watermarks which are specific to each watermarking data stream, from which a watermarking information can be embedded in the watermarked stream; said method comprising:
   processing, in a security module of the device, at least some of said control messages for retrieving access data therefrom,
   removing protection applied on at least some of said conditional access streams;
   generating the watermarked stream from said conditional access streams by selectively processing said watermarking data streams depending on said access data and wherein the selectively processing comprises:
   accessing a watermarking data stream selected according to the access data included in said control messages;
   generating the watermarked stream by removing the impairments of the main stream by replacing one or more payload portions of the main stream a watermarked payload portion of the original stream from said selected watermarking data stream.
7. The method of claim 6, wherein the number of watermarking data streams suitable to be processed is at least equal to a radix of a numeral system in which the watermarking information is coded.
8. A method for providing conditional access streams and encrypted control messages, subsequently usable as input data for generating a watermarked stream embedding a watermarking information, comprising:
   providing said watermarking information;
   providing said main stream comprising payload portions of an original stream and payload portions comprising impairments and said watermarking data streams;
   protecting at least some of said conditional access streams;
   providing said control messages with access data suitable to enforce a selective processing of said watermarking data streams;
   correlating, through said control messages, said selective processing with said watermarking information, to provide subsequent embedding of said watermarking information in the watermarked stream; and
   outputting said control messages and said conditional access streams, so as to allow subsequent generation of said watermarked stream therefrom,
   wherein said watermarking data streams are generated by watermarking some payload portions of an original stream with watermarks which are specific to each watermarking data stream.
9. The method of claim 8, wherein said watermark information is information coded in compliance with a numeral system; said selective processing being correlated with said coded information.

10. The method of claim 8, wherein the number of provided watermarking data streams is at least equal to a radix of the numeral system in which the watermarking information is coded.

* * * * *